April 21, 1931. F. CIRIGNANI 1,801,487

FRUIT PRESS

Filed July 11, 1927

Inventor:
Frank Cirignani
By Milo B. Stevens & Co.
Attys

Patented Apr. 21, 1931

1,801,487

UNITED STATES PATENT OFFICE

FRANK CIRIGNANI, OF CHICAGO, ILLINOIS

FRUIT PRESS

Application filed July 11, 1927. Serial No. 204,844.

My invention relates to fruit presses, and more particularly to such presses as may be handily used to draw the juices from fruits in season, and it is my main object to provide a novel press of this kind which performs its work in an efficient manner.

A further object of my invention is to construct the novel press with a peculiar conveying element for the fruit, whereby the latter may be fully carried through the pressing stage.

Another object of my invention is to provide a colander element to pass the juice from the moist fruit into a delivery chute previous to the engagement of said fruit by the press.

A final but nevertheless important object of the invention is to construct the novel machine of few and simple parts, so that it may be easily handled and cheaply produced.

With the above objects in view and any others that may suggest themselves from the specification and claims to follow, a better understanding of the invention may be gained by reference to the accompanying drawing, in which—

Figure 1:
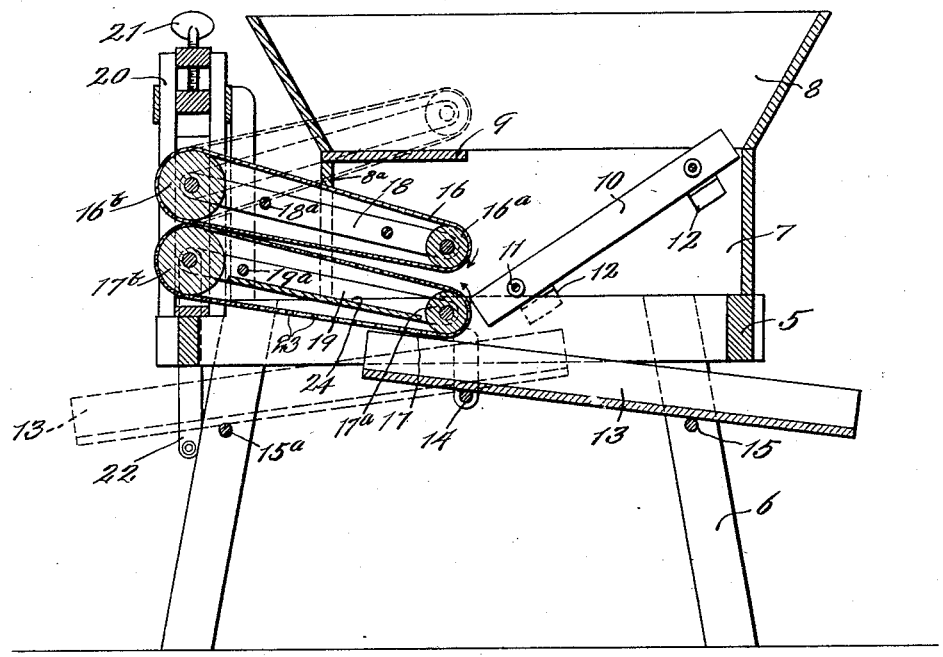
Figure 1 is a vertical section of the press, such as may be taken on the line 1—1 of Fig. 3.

Referring specifically to the drawing, 5 denotes a stand or base upon which the press is erected, said base having a set of legs 6 for support upon a floor or other surface. Upon the base is erected the body of the press 7 which is in the nature of a boxed enclosure adapted to receive a hopper top 8. This top may be lifted off the body or hinged to swing away from the same if desired.

The hopper 8 is formed with a depending lip 8a which extends downwardly to within a slight distance of the top flight of the belt 16 and prevents any excess fruit from working out of the body of the press in this direction. The hopper 8 is also provided with a bottom platform 9 positioned above the conveyor element and adapted to receive the fruit which would ordinarily fall onto the belt 16, thus protecting the conveyor from undue pressure and possible "jamming" when the hopper is filled with fruit. The platform 9 extends far enough backward so that fruit falling therefrom will be deposited on the inclined colander element 10. This element is simply an assembly of laterally spaced rails bound by cross ties 11 and resting upon bracket fittings 12 applied to the walls of the press body and base. The colander element 10 is provided for the filtration of juice in moist fruit before the fruit reaches the pressing stage, such juice draining upon a chute 13 positioned under the base 5 and running into a suitable pail or receptacle (not shown). The chute is necessarily somewhat inclined, the inner portion resting in a stirrup 14 depending from the base, and the outer portion resting upon a cross rod 15 between the corresponding legs 6.

The fruit received upon the colander element 10 is deflected in a downward direction by the inclined position thereof, so as to enter between the belts 16 and 17 of a conveyor element. These belts are of a suitable material, such as rubber, for endurance and to be proof to absorption, and are trained medially of the press upon rollers 16a and 17a, while exteriorly of the press they are trained upon rollers 16b and 17b. The rollers of the respective conveyor sections are mounted in side bars 18 and 19 respectively, these being suitably spaced by intermediate rods 18a and 19a. Opposite the colander element, the conveyor is slightly open, as indicated in Figure 1, so as to receive between its belts the fruit deposited from the colander element. However, when the conveyor sections are operated to move the belts in the direction of the arrows, it will be seen that the fruit will be carried toward the left-hand end of the machine between the conveyor belts, so as to pass for issue from between the latter at the site of the outer rollers 16b and 17b. These rollers are mounted in an adjusting frame 20 with screws 21 and internal springs (not visible) operated exactly as the common wringer to depress the roller 16b upon the roller 17b with spring tension. As shown more particularly in Figure 3, the spindles of the rollers 16b and 17b carry meshing gears 16c and 17c to cause the rollers to operate in the desired manner whereby the belts may move in the direction mentioned; and the spindle of the roller 17b is provided with a crank handle 22 for manual operation or with a suitable pulley for a power connection.

Figures 2, 3:
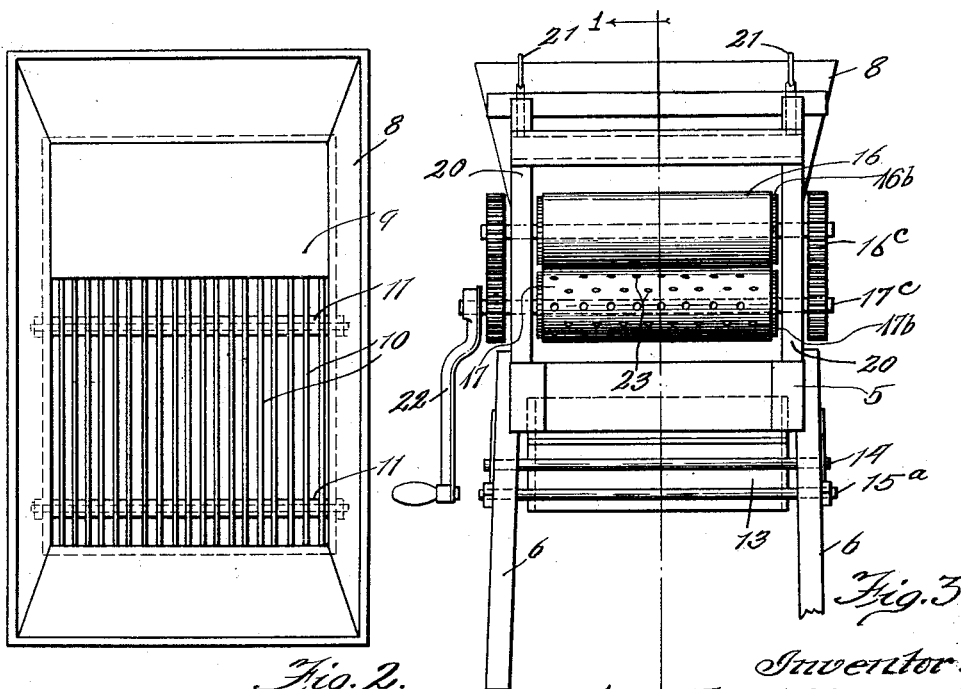
Fig. 2 is a plan view of a receiver or hopper forming a part thereof.
Fig. 3 is a view from the front end thereof.

As seen in Figure 3, the rollers 16b and 17b are serrated or milled longitudinally to exert a firm grip upon the conveyor belts 16 and 17; and the belt 17 is formed with a plurality of perforations 23 across its surface to permit the fruit juice to filter through as the fruit is pressed, a platform 24 being provided between the runs of the belt 17 to catch these juices and direct them into the chute 13.

As will be observed, the pulp of the pressed fruit will fall from between the belt runs of the rollers 16b and 17b into a suitable receptacle therefor. If it is, however, desired that the juices run into the same receptacle with the pulp, the delivery chute 13 may be shifted to the corresponding part of the machine to rest upon a cross rod 15a with its outer portion, as denoted by dotted lines in Figure 1. While in this instance there is no catch element directly under the colander element 10, it will be obvious that the juices running through the latter would trickle down the slope thereof in a direction inwardly of the press so that they would be caught in the newly positioned chute 13.

A press constructed in accordance with the above description is simple and operates in an efficient manner. When it is desired to inspect the conveyor, all that is necessary is to lift or swing away the hopper 8 with its depending lip 8a and platform floor 9, when it will be an easy matter to swing up the upper conveyor element as indicated by dotted lines to inspect or clean the parts entering into the pressing operation. The said upper conveyor element has sufficient weight to rest upon the fruit as it is received into the conveyor; yet, it may be manually raised for the purposes outlined without disturbing the arrangement of the other parts. The rollers are preferably of wood, and the balance of the parts are engineered for the best operative and sanitary conditions.

While I have illustrated and described my invention in the preferred form, it will be evident that the same is capable of many minor changes and refinements, and it is my intention to claim such changes and refinements as coming within the spirit and scope of the appended claims.

I claim:

1. In a fruit press yielding juices medially, a stand, supports medially and at each end of the latter, and a discharge chute disposed on the medial support and shiftable to a position over either end support for selectively delivering said juices.

2. In a fruit press yielding juices medially thereof, a stand having a medial support, supports at each end of said stand arranged below the medial support, a discharge chute arranged transversely of the supports and shiftable to a position over either end support for selectively delivering the juices in opposite directions.

3. In a fruit press adapted to yield juices medially thereof, a stand having a transversely extending medial support, supports arranged parallel to said medial support and below the latter, a discharge chute arranged transversely of the supports and shiftable to a position over either end support for selectively delivering the juices in opposite directions.

In testimony whereof I affix my signature.

FRANK CIRIGNANI.